United States Patent [19]

Neff et al.

[11] Patent Number: 5,175,456
[45] Date of Patent: Dec. 29, 1992

[54] WORKPIECE TRANSPORTER

[75] Inventors: Edward A. Neff, Rancho Santa Fe; Eric V. Kanto, Palm Springs, both of Calif.

[73] Assignee: Systems, Machines, Automation Components Corp., Murrieta, Calif.

[21] Appl. No.: 765,130

[22] Filed: Sep. 25, 1991

[51] Int. Cl.$^5$ ............................................. H02K 41/00
[52] U.S. Cl. ........................................ 310/13; 310/12; 29/834
[58] Field of Search ................. 29/739, 743, 744, 834, 29/740, 741; 310/12, 13, 14

[56] References Cited

U.S. PATENT DOCUMENTS

| | | | |
|---|---|---|---|
| 4,498,023 | 2/1985 | Stout | 310/14 |
| 4,575,652 | 3/1986 | Gogue | 310/49 R |
| 4,809,430 | 3/1989 | Maruyama et al. | 29/834 |

Primary Examiner—R. Skudy
Assistant Examiner—Judson H. Jones
Attorney, Agent, or Firm—Nydegger & Associates

[57] ABSTRACT

An actuator for precisely moving and positioning a manufacturing component includes a housing on which a magnet is mounted. An electrical coil is wound around a coil piston which is slidingly mounted on the housing for movement within the magnetic field generated by the magnet. A rod, having a member for gripping the component, is attached for movement with the coil piston, and a source of electrical current is connected to the coil which is wrapped around the coil piston. In the operation of the actuator, a current is selectively passed through the coil. This current in the coil then moves the coil piston and the attached grip within the magnetic field to position the component as desired. Additionally, a position sensor can be mounted on the device to determine the location of the coil piston and a controller can be incorporated in the actuator to use this position determination for controlling movement of the coil piston and the attached grip.

17 Claims, 5 Drawing Sheets

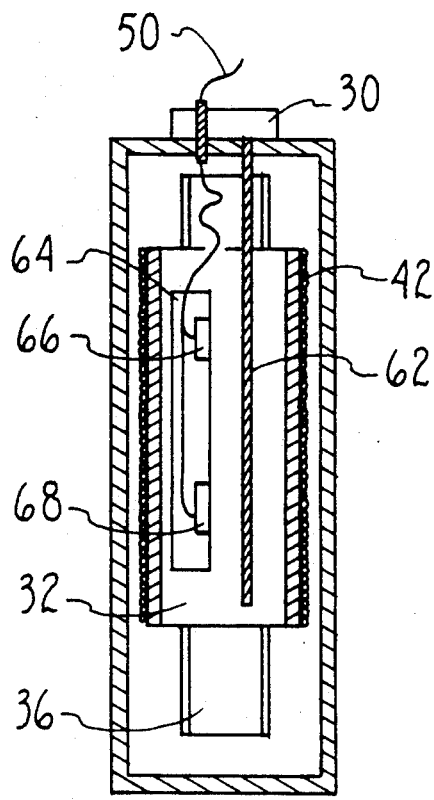
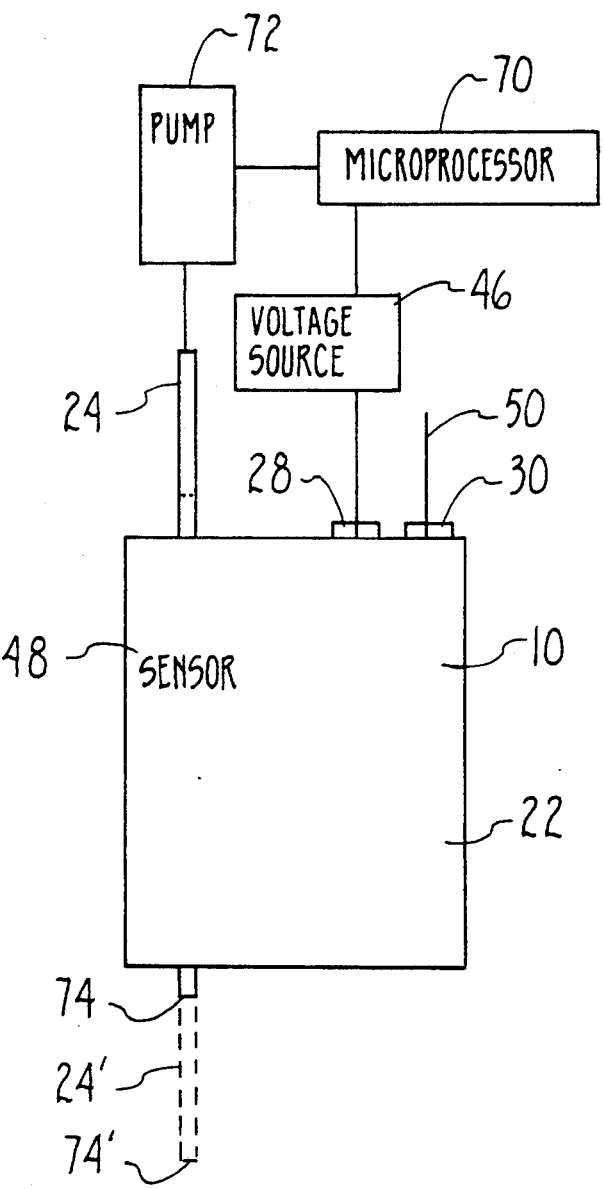
Fig. 6
Fig. 7

WORKPIECE TRANSPORTER

FIELD OF THE INVENTION

The present invention pertains generally to machines which are useful for the automated assembly of products. More specifically, the present invention pertains to apparatus and devices which are useful for inspecting, assembling and positioning component parts in a product assembly process. The present invention is particularly, but not exclusively, useful as an actuator for the quick movement and precise positioning of relatively fragile component parts during an automated assembly procedure while generating extremely light forces on the component parts.

BACKGROUND OF THE INVENTION

Numerous devices which are useful for the automated assembly of products have been successfully used for many years. In each instance, automated assembly devices have been employed with a view toward increasing the efficiencies and accuracies of the methods, procedures and processes which are followed during the manufacture and the assembly of a completed product. Indeed, the vast majority of consumer products are now manufactured on assembly lines which incorporate automated assembly devices.

It is easy to appreciate that as the complexity of a manufactured product increases, there may also be a commensurate increase in the complexity of the machines that are required to manufacture the product. This is particularly so where the component parts are delicate or fragile and precision is important. For example, many products require the precise positioning and assembly of extremely small and light weight components in their manufacture. More specifically, these operations require precision in both the movement of the component into position and in the force with which the component is moved and assembled with other components. Furthermore, for quality control purposes it is often necessary that there be some way to obtain a real time check on the precision with which the component was positioned during the assembly of the product. Where very small, fragile or light weight components are being used in the manufacturing process, and where very light forces are required for the assembly of these components these considerations become very important.

Of the known devices which are typically used for automated assembly, pneumatic devices are notoriously imprecise. This is so due primarily to the poor damping achieved by pneumatic systems. On the other hand, systems incorporating solenoids can be quite precise. Moreover, the forces which solenoids impose on components during their handling of the component can be destructive to the component or be otherwise unacceptable. One other general type device, the well-known stepper motor, also deserves some mention. Generally, stepper-motor systems can be spatially precise in their operation, and the forces which they generate can be effectively controlled. Stepper-motors, however, are bulky items and do not have good light force generation characteristics. In some manufacturing procedures these factors can be of significant disadvantage. Consequently, the present invention has recognized that an electronically operated system can be effective for the precise placement of a product component during assembly without encountering the force and spatial problems confronted by the above discussed types of systems. More specifically, the present invention recognizes that a voice coil linear motor can be applied for these purposes. While U.S. Pat. No. 4,498,023 which issued to Stout for an invention entitled "Voice Coil Linear Motor with Integral Capacitor" addresses some of the issues which are of concern to the present invention, it does not address all of the important issues. For example, the present invention is concerned with maintaining precise concentricity between the parts of the actuator device and they move relative to each other. Stout does not precisely address this problem. Further, the present invention envisions a compact configuration for the actuator which may not be attainable with the cylindrical coil disclosed for the Stout device. such as the one disclosed in U.S. Pat. No. 4,498,023 can expect to have heat generation problems which drastically effect the proposed sensors accuracy thereby rendering the device ineffective.

In addition to the advantages alluded to above, an electronic system has other characteristics which can be advantageous for a device which is to be used in the automated assembly of an end product. For example, some electronic system can rather easily lend itself to compact configurations. Further, an electronic system is responsive and can be configured to provide signals which can be used to monitor and control the operation of the system.

In light of the above, it is an object of the present invention to provide a device for moving, inspecting and positioning a component in an automated assembly operation which is capable of picking-up, transporting and depositing fragile and light weight components. It is another object of the present invention to provide a device for moving and positioning a component in an automated assembly operation which has effective control of extremely small forces and which can control such forces within a relatively fast response time. Yet another object of the present invention is to provide a device which can transport assembly components with minimal bounce (i.e. little ,if any, changes in linear direction) at the end of a component placement operation. Still another object of the present invention is to provide a device for moving, inspecting and positioning a component in an automated assembly operation which can be effectively monitored for real time verification of operational accuracy. Another object of the present invention is to provide an automated assembly device which is relatively simple to use, is relatively easy to manufacture and is comparatively cost effective.

SUMMARY OF THE INVENTION

An actuator for transporting and positioning a workpiece in an automated assembly procedure includes a housing, with a magnet fixedly mounted on the housing to establish a magnetic field within the housing. The magnet is preferably a rare earth magnet and is formed with a projection that extends through the central chamber of the housing. A coil piston, formed with an open passageway, is slidingly mounted on the housing and is positioned to surround the magnet with the projection of the magnet extending through the passageway. A conductive wire is wrapped around the coil piston to create a coil assembly.

In accordance with the present invention, the actuator also includes a grip which is mounted on the coil piston to hold the workpiece or product component during its transfer from a supply source into position for product assembly. Preferably, the grip is a hollow rod which is mounted on the coil piston for linear movement with the coil piston and for rotation on the coil piston about the longitudinal axis of the rod. For one embodiment of the actuator the grip can have an end piece which is operable to grasp the workpiece or component to be moved. In an alternate embodiment for the actuator, a vacuum source can be operatively connected with the rod to create a suction through the hollow rod that holds the workpiece or product component against the rod during transport.

For the operation of the actuator of the present invention, a source of electrical current is provided and is connected directly to the coil of the coil assembly. Electrical currents from this source are passed through the coil as desired by the operator. Because the coil is disposed in the magnetic field that is generated by the magnet, current flow through the coil creates a force on the coil piston. This force then moves the coil piston and the grip relative to the housing. Additionally, the actuator itself can be moved in any manner well known in the art, and the concerted action of actuator movement and the movement of the grip relative to the rest of the actuator can be used to transport a workpiece or a product component from one location to another.

A position sensor can be mounted on the housing of the actuator to detect the location of the coil piston, and hence the grip, relative to the housing. As intended for the present invention, the sensor can be either a relatively uncomplicated capacitive type sensor or, preferably, a more sophisticated optical encoder. In any case, the position sensor can be used to calibrate movement of the grip and to establish its start and stop points. Further, signals generated by the position sensor can be used to control the operation and movement of the coil piston and to inspect the result of the actuator's operation. To do so, the actuator can be modified to include a microprocessor which compares the actual position of the coil piston (as indicated by the position sensor) with a preset desired position of the coil piston (in accordance with programmed input). This comparison will generate an error signal. Depending on the magnitude of this error signal, control of the coil piston can be accomplished by moving the coil piston in a manner which will reduce the error signal to zero. This, of course, is done if control is he objective. On the other hand, if inspection and quality control are the objectives, the error signal can be maintained and the assembled product rejected if the error signal exceeds the established tolerance.

The novel features of this invention, as well as the invention itself, both as to its structure and its operation will be best understood from the accompanying drawings, taken in conjunction with the accompanying description, in which similar reference characters refer to similar parts, and in which:

BRIEF DESCRIPTION OF THE DRAWINGS

FIG. 6 is a cross-sectional view of an embodiment of the device of the present invention as would be seen along the line 5—5 in FIG. 2;

FIG. 7 is a schematic diagram of the electrical connections between various components of the device of the present invention.

DESCRIPTION OF THE PREFERRED EMBODIMENT

Figure 1:
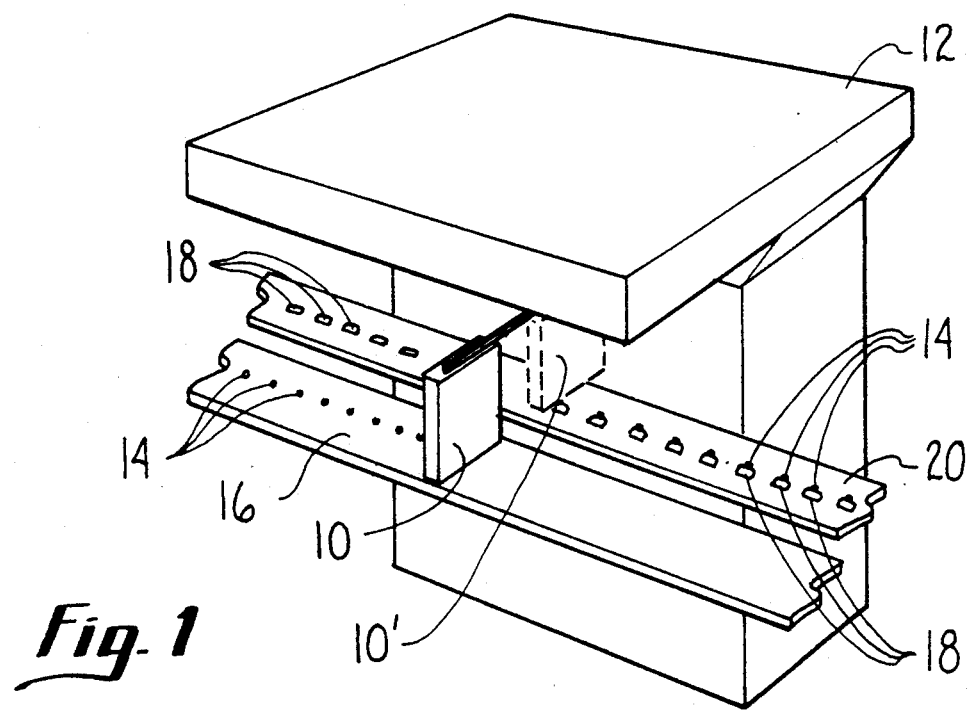
FIG. 1 is a perspective view of the present invention in its operative environment.

Referring initially to FIG. 1, the actuator device of the present invention, for moving and positioning an assembly component in an automated assembly operation, is shown in its intended environment and is designated 10. As shown, the device 10 is operatively mounted on an automated assembly machine 12 for movement between a position wherein the device (designated 10) retrieves a component 14 from a conveyor 16 and transports the component 14 to a position wherein the device (designated 10') places the component 14 into engagement with another end product component 18. After their assembly, the combination of components 14 and 18 is then taken by a conveyor 20 to a subsequent workstation where it is packaged or further combined with other components (not shown). As far as the device 10 and its operation is concerned, it is to be appreciated that the machine 12 shown in FIG. 1 is only exemplary. Indeed, the device 10 can be mounted on a variety of machines (not shown) for movement between a plurality of preselected positions.

Figure 2:
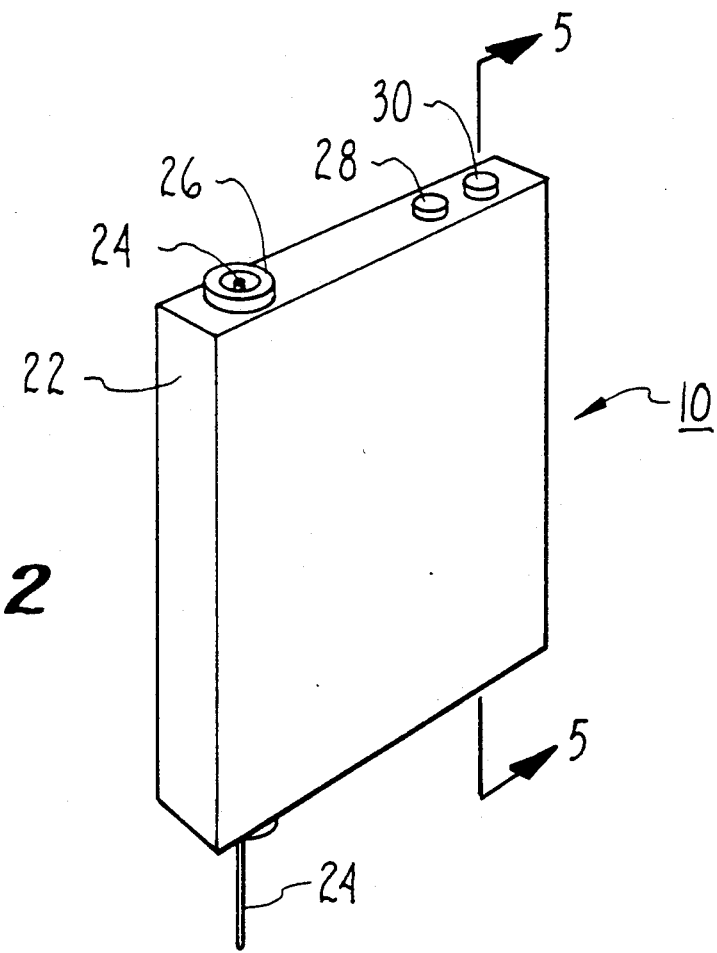
FIG. 2 is a perspective view of an embodiment of the present invention.

In FIG. 2 it is seen that the actuator device 10 includes a housing 22 which is relatively compact, and is configured and dimensioned to be comparatively flat. Importantly, though not shown in the Figures, this configuration allows the actuator device 10 to be easily stacked with other such devices for improved efficiency in an automated assembly operation. FIG. 2 also shows that a grip (or rod) 24 is mounted on the housing 22. Specifically, for the present invention, the rod 24 is preferably an elongated tubular member which is slidingly mounted on the housing 22 and which extends through the housing 22 substantially as shown. It will also be seen in FIG. 2 that the housing 22 is provided with an attachment 26, and with an electrical connector 28 and a sensor connector 30. Insofar as the rod 24 is specifically concerned, the rod 24 is slidingly mounted on the housing 22 between the attachment 26 and a bearing 27 (see FIG. 4) which is located on the housing 22 opposite from the attachment 26. Further, as so mounted, the rod 24 can be rotated about its longitudinal axis if desired.

Figure 3:
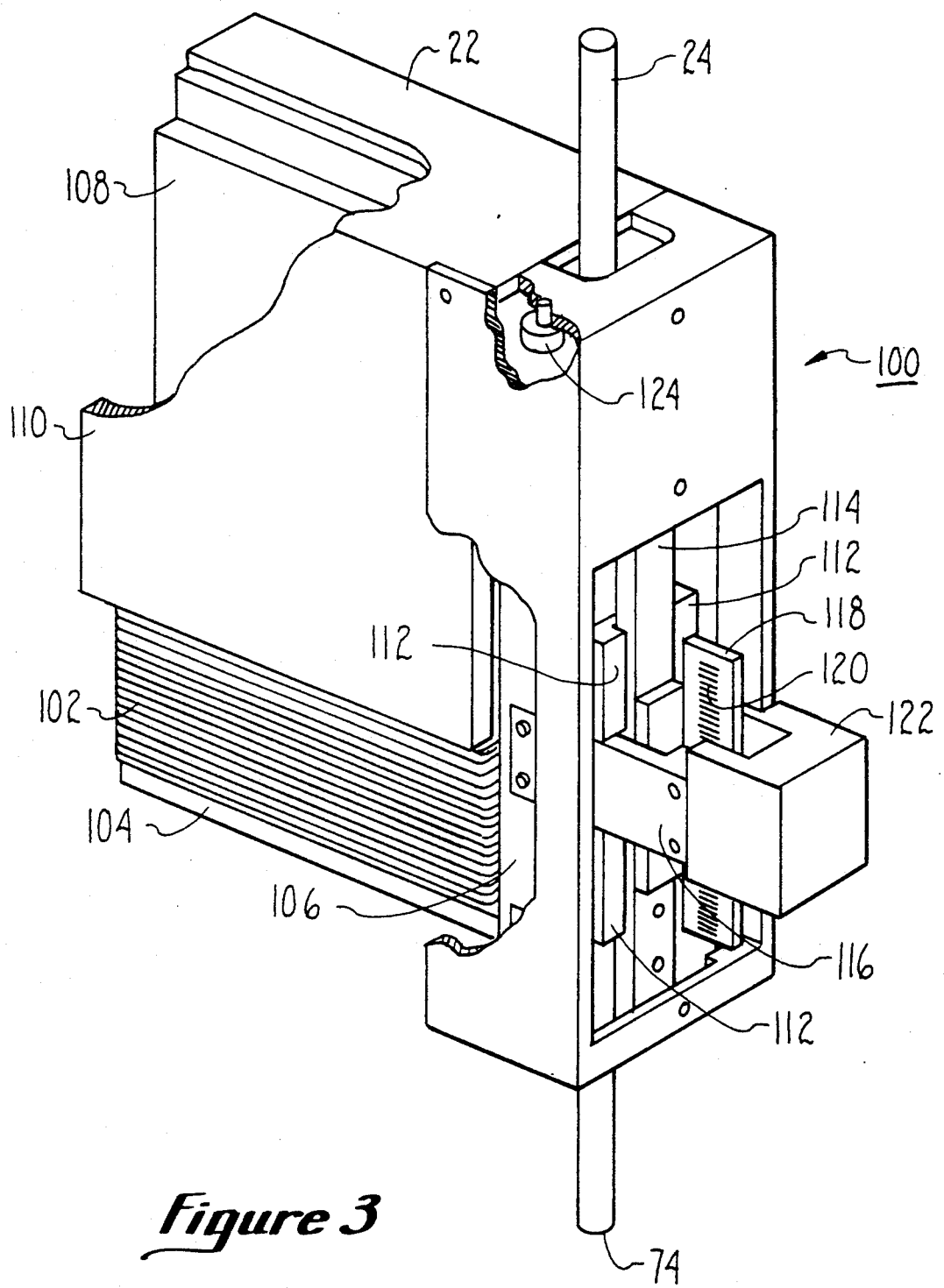
FIG. 3 is a perspective view of the preferred embodiment of the present invention with portions removed and portions broken away for clarity.

Referring to FIG. 3, the preferred embodiment of the actuator for the present invention is shown and generally designated 100. This embodiment of actuator 100 includes an electrical coil 102 which is shown here to be in a substantially flattened configuration. The actual shape of coil 102, however, is of minimal importance and will in large part be determined by the desires of the manufacturer. In fact, coil 102 could have been shown to be cylindrically configured. In any case, the windings of coil 102 must somehow be configured to surround a hollow space.

FIG. 3 shows the coil 102 wrapped around an extension 104 of a coil piston 106. Although this embodiment of actuator 100 shows a particular structure around which the coil 102 is wrapped, the skilled artisan will appreciate that coils are commercially available which do not require such structure. Such coils may, of course, be used with the present invention. Regardless, it is important that the coil 102 be physically attached to the coil piston 106 and able to move with the coil piston 106. Further, it is important for the present invention that the grip 24 be operatively attached to the coil piston 106 and able to move with the coil piston 106.

A magnet 108 is shown attached to the housing 22 of actuator 100 and a magnet return 110 is also shown attached to the housing 22 and distanced from the magnet 108 so that an effective flux field is established as the environment for the coil 102. Preferably, magnet 108 is a rare earth magnet having a permanent magnetic capability of 35 MEG oersted. As intended for the present invention, the coil 102 actually surrounds magnet 108. This establishes a cooperation between the coil 102, the magnet 108 and the magnet return 110 in which a portion of the coil 102 is able to move between the magnet 108 and the magnet return 110.

The coil piston 106 is fixedly attached to a linear bearing 112 and the linear bearing 112 is slidingly mounted on a bearing rail 114. The bearing rail 114, in turn, is fixedly mounted to the housing 22. This arrangement allows the linear bearing 112 with its attached coil piston 106 and coil 102 to slidingly move within the housing 22. Consequently, because the windings of coil 102 are oriented substantially perpendicular to the flux field generated by the magnet 108, the application of an electrical current to the coil 102 will generate a force on the coil piston which causes the coil housing 22. This movement needs to be monitored and controlled.

Control over the movement of coil 102, and thus control over the grip 24, is achieved by monitoring the position of coil piston 106 relative to the housing 22. This is done using an encoder 122, such as a model SRL 4 encoder manufactured by Dynamics Research Corporation which is fixedly attached to the housing 22. More specifically, for actuator 100, a bracket 116 is fixedly attached to linear bearing 112 and a glass encoder slide 118, with a scale 120 etched or printed thereon, is fixedly attached to the bracket 116. Accordingly, glass encoder slide 116 moves together with both linear bearing 112 and coil piston 106. In a manner to be subsequently discussed in greater detail, the actuator 100 uses information from the encoder 122 regarding the position of glass slide 118 to precisely fix the position of coil piston 106, and thus the position of grip 24, relative to housing 22. Using this arrangement, accuracies on the order of five hundredths of a millimeter (0.05 mm) have been attained for determining the actual position of rod 24. Additionally, rod 24 can have a magnet (not shown) which is mounted on the rod 24 for movement therewith. Another magnet 124, shown fixedly mounted on the housing 22 is electrically activated to magnetically engage with the magnet on rod 24 to hold the rod 24 and its associated coil assembly in a detent or withdrawn configuration during the idle time for the actuator 100. The position of either the magnet on rod 24 or the magnet 124 can be adjusted to allow proper engagement of the rod 24 with the housing 22 in the detent position for rod 24.

Figure 4:
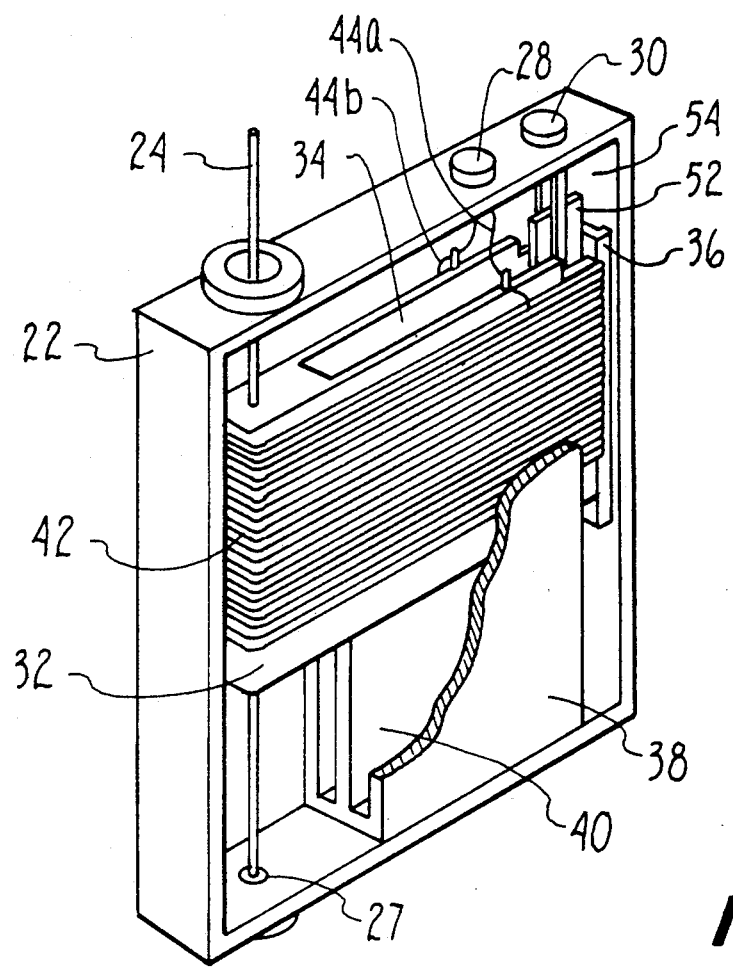
FIG. 4 is a perspective view of an alternate embodiment of the present invention with portions removed and portions broken away for clarity.

The details for an alternate embodiment of the actuator device 10 will be appreciated with reference to FIG. 4 wherein it is seen that the device 10 includes a bobbin 32 (simi)ar to coil piston 106 for the preferred embodiment) which is formed with a hollow 34. Indeed, in most respects the alternate embodiment is similar to the preferred embodiment and the purposes are the same. As shown, the bobbin 32 is relatively flat, like housing 22, and is generally box shaped. Further, the bobbin 32 is slidingly attached to a slide mechanism 36 which is itself fixedly attached to the housing 22. Preferably, this mechanism 36 is a very light precision way which creates minimal friction forces during movement of the bobbin 32. The mechanism 36 can be established in any of several ways, all known in the pertinent art, and can be provided with travel stops which will limit the distance through which bobbin 32 can travel along the mechanism 36. Preferably, the extent of this travel is in the range of between two and four inches (2-4 inches). Consequently, the bobbin 32 is able to slide freely along the mechanism 36 and to reciprocate within the housing 22 through this distance. It is also important to recognize that the grip 24 is attached to the bobbin 32 for linear movement with the bobbin 32.

FIG. 4 also shows that a magnet 38 is mounted inside the housing 22. Specifically, the magnet 38 is formed with a projection 40 and is positioned inside the housing 22 so that the projection 40 of magnet 38 extends into the hollow 34 of the bobbin 32. Preferably, the magnet 38 is of a commercially available type which is made of a rare earth element. For example, a Neodenium 35 megagaussoersted magnet is suitable for use in the present invention. Further, it is preferable that the magnet 38 be a permanent magnet which is capable of operating with a magnetic intensity on the order of approximately thirty-five MEG oersted (35 MOe). When the magnet 38 is positioned in housing 22 as shown in FIG. 4, it will be appreciated by the skilled artisan that the poles of magnet 38 can be oriented on the housing 22 to effectively establish a magnetic field having flux lines that are aligned substantially perpendicular to the directions along which the bobbin 32 reciprocates in the housing 22.

The device 10 also includes a coil 42 which is made from an electrical wire 44 that is wound around the bobbin 32. Importantly, the winding of coil 42 around the bobbin 32 should be sufficiently tight to effectively join coil 42 to the bobbin 32. The ends 44a and 44b of the electrical wire 44 are electrically attached to the connector 28 so that an external voltage source 46 (shown in FIG. 7) can be used to energize the coil 42. As will be appreciated by those skilled in the pertinent art, with the coil 42 located in the magnetic field that is generated by the magnet 38, when a current from voltage source 46 is passed through the coil 42 a force is imposed on the bobbin 32 that will move the bobbin 32 within the housing 22. Depending on the amount, the direction, and the duration of the current which is passed through coil 42, the force which is generated on the bobbin 32 can be controlled. Preferably, the magnitude of the forces generated on the bobbin 32 will be in a range from zero to ten thousand grams (0–10000 grams). As intended for the present invention the actuator 10 (FIGS. 2 and 4) as well as the actuator 100 (FIG. 3) will likely operate in a range where approximately zero to two thousand grams (0–2,000 gm) variable of force are selectively applied with a deviation of only plus or minus one gram ($\pm 1$ gm). Further, as is well known in the pertinent art and as indicated above, the position and direction of travel of the bobbin 32 can be controlled by the magnitude and direction of flow of current through the coil 42.

Figure 5:
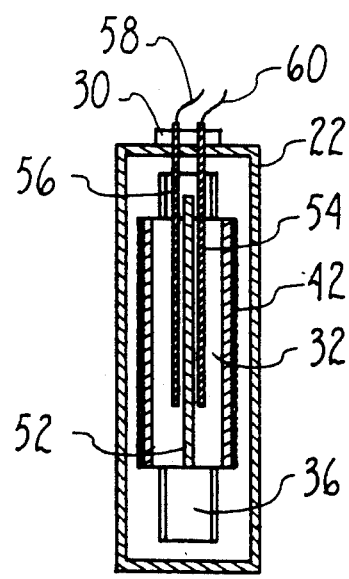
FIG. 5 is a cross-sectional view of an embodiment of the device of the present invention as seen along the line 5—5 in FIG. 2.

For the operation of the device 10, it is important to be able to determine the positional relationship between the bobbin 32 and the housing 22. To do this, several position sensors can be suggested. Referring for the moment to FIG. 7, it will be seen that a sensor 48 is incorporated into the device 10 and is operatively connected through a line 50 to the sensor connector 30 located on housing 22 of device 10. Further, line 50 completes the connection between sensor connector 30 and microprocessor 70. In one embodiment the position sensing function can be accomplished using a capacitance inductance (LVDT) sensor like the one shown in FIG. 5. There it will be seen that the device 10 can include a middle plate 52 which is fixedly mounted to the bobbin 32 for movement with the bobbin 32 in the housing 22. This middle plate 52 is then disposed between a plate 54 and a plate 56 which are each fixedly connected to the housing 22 of device 10. Further, the plates 54 and 56 are respectively connected to lines 58 and 60 which, together, constitute the line 50 in this embodiment. Consequently, as middle plate 52 moves with the bobbin 32, the electrical capacitance between the plate 54 and 56 will be changed. This change in capacitance can be determined by the sensor 48 by means well known in the art to ascertain the position of the bobbin 32 relative to the housing 22. The flat plates remove concentricity problems and, as they are located away from the coil [a heat source], the sensor will be accurate.

In an alternate embodiment of the sensor 48, the capacitive elements comprising the plates 52, 54 and 56 are removed and, instead, a photo-electric system much like the encoder 122 previously discussed in conjunction with the actuator 100 is incorporated. Specifically, a scale 62 is fixedly attached to the housing 22 and, as indicated by cross-referencing FIGS. 5 and 6, the scale 62 is generally located in the same position as was the plate 54 in the embodiment previously disclosed for the sensor 48. Additionally, a photoelectric detector 64 is fixedly mounted on the bobbin 32 for movement therewith. The detector 64 can include photodiode elements 66 and 68 which, either individually or collectively, will interact optically with the scale 62, in a manner well known in the pertinent art, to provide information about the position of the bobbin 32 relative to the housing 22.

OPERATION

Figure 8:
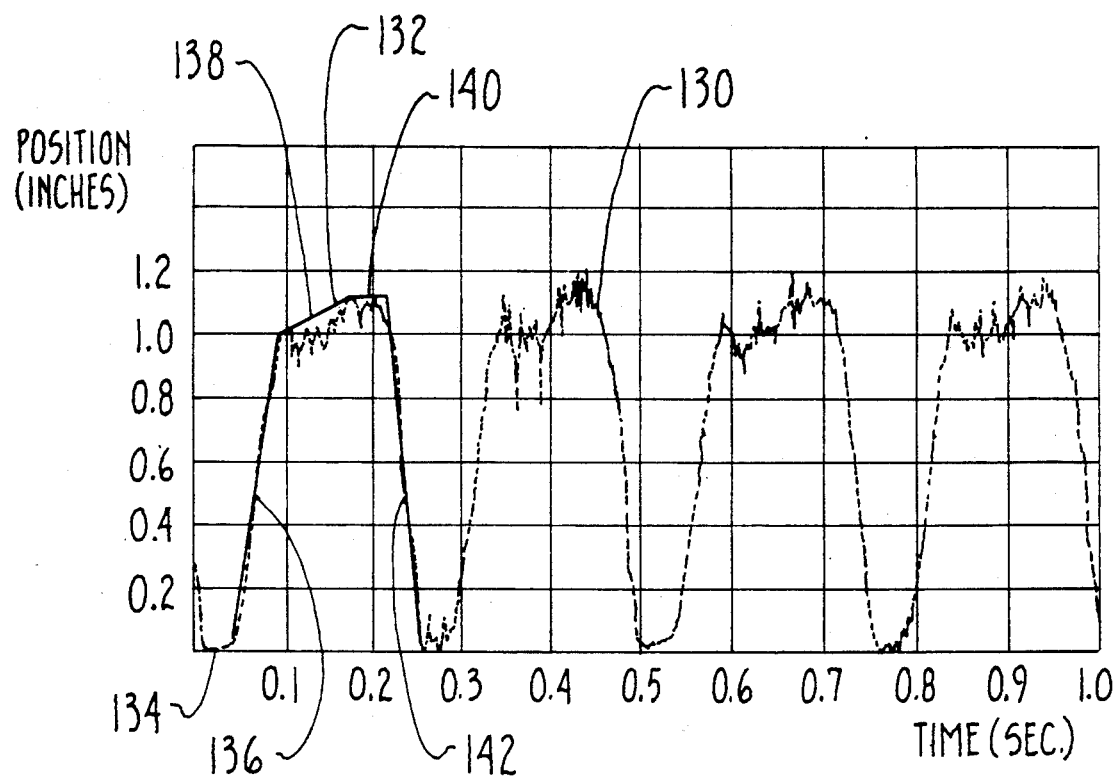
FIG. 8 is a graph showing the relationship of position and time for the grip operations of the actuator.

The general operation of the actuator device 10 or 100 will, perhaps, be best understood by reference to FIG. 7 and FIG. 8. In FIG. 7 it will be seen that a microprocessor 70, of any type well known in the pertinent art, is connected to both the voltage source 46 and the sensor 48. Additionally, microprocessor 70 is connected to a vacuum pump 72 which can, in turn, be operatively connected with the grip 24. Through these connections, the microprocessor 70 will interact with the voltage source 46, the sensor 48 and the pump 72 in accordance with preprogrammed instructions. Although references here may be directed to the embodiment of the device 10 shown in FIGS. 2 and 4, it is to be understood that corresponding components of the actuator 100 operate in substantially the same manner. Their operation is considered to be equivalent.

Initially, the device 10 (actuator 100) can be incorporated into the automated assembly machine 12 and calibrated to locate the end 74 of grip 24 at a preselected distance from the conveyor 16. This establishes a reference datum for the cycle from which movement of the grip can be measured. Actually, as will be appreciated by the skilled artisan, any other appropriate reference may be used for this purpose. Regardless what reference is used, once a reference datum from which measurements can be made has been selected, the sensor 48 can be set for this datum. In accordance with preprogrammed instructions, the microprocessor 70 then activates the voltage source 46 to send an electrical current through the coil 42. Because the coil 42 is in the magnetic field of the magnet 38, the current which passes through the coil 42 causes bobbin 32 (or coil piston 106 for actuator 100) to move a distance which is proportionately determined and controlled by the amount, duration and direction of the current. It is known, for example, that with this disclosed arrangement, the grip 24 can be linearly moved through a distance of approximately two inches (2 in.) in around seventy milliseconds (70 ms) with effectively no bounce at the end of the stroke. Stated differently, movements of this nature can be made without noticeable changes in the direction of linear movement at the conclusion of the movement.

The microprocessor 70 can also be used to control the operation of a vacuum pump 72. This may be helpful for an embodiment of the device 10 which uses the creation of a partial vacuum in the lumen (not shown) of the tubular grip 24 to hold a component 14 against the end 74 of the grip 24. It is to be recognized that other gripping arrangements may also be used. The partial vacuum system disclosed herein is only exemplary.

As intended for a representative cycle in the operation of the present invention, the device 10 is initially position as shown in FIG. 1 with the grip 24 positioned over a component 14 which is being taken into position for retrieval 70 by the conveyor 16. Voltage source 46 is then activated in accordance with a preprogrammed sequence from microprocessor to lower the end 74 of grip 24 into a position indicated for end 74'. In accordance with previous disclosure, this movement is accomplished by passing a predetermined current through the coil 42. Pump 72 is then activated to generate a partial vacuum within the lumen of grip 24 to suck and hold the component 14 against the end 74. Grip 24, with component 14 attached, is then withdrawn into the housing 22, by the activation of coil 42, and the device 10' is positioned over conveyor 20. Again, coil 42 is activated by the voltage source 46 to precisely lower component 14 to a desired stop point and into position on the component 18. This placement can be accomplished with great precision. For example, tolerances on the order of one one-hundredths of a millimeter (0.01 mm) have been accomplished using the device 10 of the present invention. Importantly, sensor 48 can be used to monitor this placement and thereby provide a real-time verification of proper assembly.

Once component 14 has been properly positioned on the component 18, microprocessor 70 can be used to control the pump 72 to relieve the vacuum created in the grip 24 to release the component 14 from the grip 24. Again, the grip 24 is withdrawn into the housing 22 and the device 10 is repositioned over the conveyor 16 for another cycle of operation.

An actual time history response for the position of rod 24 during a series of cycles is shown in FIG. 8 and is designated 130. The response 130 is, in fact, only exemplary. Indeed, rod 24 may be moved through greater or lesser distances and the time for each cycle may be varied. Nevertheless, response 130 is considered typical for the actuator 100 and is used here for discussion purposes. For the specific case illustrated in FIG. 8, the response 130 is shown over a one second period of time and indicates that the actuator 100 has moved rod 24 through four complete cycles during this one second interval. Further, FIG. 8 shows that rod 24 was reciprocally moved through a distance of approximately one and one tenth inches (1.1 in) in each cycle. As indicated above, the position of rod 24 at any time during the cycle can be determined by encoder 122 to an accuracy within five thousandths of a millimeter (0.005 mm). Consequently, the completion of a cycle within a preprogrammed dimensional envelope can be used to indicate whether the work has been successfully completed. Additionally, with this control, and in view of the extremely small masses which are moved during the operation of actuator 100, the forces which are generated on a workpiece as it is being handled by actuator 100 will be very light. Tests have indicated that forces as small as five grams (5 gm) can be generated with actuator 100 and that forces of this small magnitude can be generated with an accuracy of plus or minus one gram ($\pm 1$ gm).

For a more complete appreciation of the operational aspects of the actuator 100, consider the idealized curve 132 which has been superimposed over the first cycle of the response 130. The curve 132 for this cycle begins at time zero with the rod 24 in its withdrawn position and ends approximately one quarter second later (0.25 sec) when the rod 24 has returned to its withdrawn position. A discussion of this cyclic operation is appropriately discussed by considering individual time intervals within a particular cycle.

The beginning of the cycle is indicated in FIG. 8 by the top dead center portion 134 of curve 132. In practice, top dead center portion 134 corresponds to the position 74 shown in FIG. 7 and, as shown, rod 24 stays in this position during approximately the 0.00–0.04 seconds interval of the cycle. A positioning stroke 136 for curve 132, which immediately follows top dead center portion 134, indicates that rod 24 is quickly moved through a distance of approximately one inch during the cycle interval from 0.04– 0.09 seconds. This rapid movement of the rod 24 is possible due to the relatively small mass of the components in actuator 100 which must move with the rod 24. A deceleration period during the interval 0.09–0.17 seconds of the cycle is provided to steadily move the rod 24 into proper position with precision and minimal inertial forces.

Once contact has been established between the workpiece being carried by rod 24, and the substrate onto which the workpiece is being placed, there is an interval between approximately 0.17–0.21 seconds in the cycle wherein force is applied to attach or position the workpiece on the substrate. This interval is indicated as the force application period 140 in FIG. 8. During period 140, the successful completion of the work can be verified by monitoring signals from encoder 122. Specifically, by comparing signals from encoder 122, which indicate the actual position of the rod 24 at this point in the work cycle, with a reference for the programmed position for rod 24 at this point during a successful work cycle, operational deviations can be determined. If this comparison indicates only minor deviations in the position of rod 24, and these deviations are within acceptable tolerances, the work cycle can be considered successful.

After the force application period 140, the rod 24 is withdrawn back to a top dead center position during an interval in the cycle during approximately 0.21–0.25 seconds. The cycle is then repeated as necessary and the same intervals are used. As indicated above, the cycle discussed here in relation to the idealized curve 132 is only exemplary. The parameters which establish the operational envelope for actuator 100 and device 10 can be varied according to the desires of the operator.

While the particular device for moving and positioning an assembly component in an automated assembly operation as herein shown and disclosed in detail is fully capable of obtaining the objects and providing the advantages herein before stated, it is to be understood that it is merely illustrative of the presently preferred embodiments of the invention and that no limitations are intended to the details of the construction or design herein shown other than as defined in the appended claims.

We claim:

1. A device for moving and positioning an assembly component in an automated assembly operation which comprises:
   a magnet formed with a projection, said magnet having a magnetic field;
   an electrical coil for carrying a current, said coil being disposed around said projection for movement within said magnetic field in response to current flow through said coil;
   a grip connected with said coil and engageable with said component; and
   means electrically connected with said coil for providing said electrical current to generate very light and very precise forces on said component during positioning of said component.

2. A device as recited in claim 1 wherein said forces generated during positioning of said component are variable and in the range of approximately zero to two thousand grams (0–2,000 gm).

3. A device as recited in claim 1 further comprising a coil piston, and wherein said coil is wrapped around said coil piston and said magnet is formed as a projection with said bobbin slidingly disposed around said projection.

4. A device as recited in claim 1 further comprising means for sensing the position of said grip.

5. A device as recited in claim 4 further comprising:
   means for establishing a desired stop position for said grip; and
   means for determining the difference between the actual position of said grip and said desired stop position to generate an error signal and cause an electrical current to flow through said coil when said error signal has an absolute value greater than zero.

6. A device for transporting and positioning a workpiece which comprises:
   a housing;
   a rare earth magnet mounted on said housing for creating a magnetic field, said rare earth magnet forming a projection;
   a bobbin slidingly mounted on said housing, said bobbin being disposed around said projection;
   a grip for holding said workpiece, said grip being attached to said bobbin for movement therewith;

a coil for generating an electrical current in said magnetic field, said coil being wrapped around and connected to said bobbin to move said bobbin in response to a generated electrical current and to create very light and very precise forces on said workpiece during positioning of said workpiece; and a source of electrical current, said source being electrically connected with said coil.

7. A device as recited in claim 6 where in said grip includes a rod attached to said bobbin and means attached to said rod for gripping said workpiece.

8. A device for transporting and positioning a workpiece which comprises:
   a housing;
   a means mounted on said housing for creating a magnetic field;
   a bobbin slidingly mounted on said housing;
   a grip for holding said workpiece, said grip being attached to said bobbin for movement therewith, said grip being moveable between a first position wherein said grip is withdrawn into said housing and a second position wherein said grip is extended from said housing; and
   a means for generating an electrical current in said magnetic field, said current generating means being connected with said bobbin to move said bobbin in response to a generated electrical current to create very light and very precise forces on said workpiece during positioning of said workpiece.

9. A device as recited in claim 8 further comprising means for selectively holding said bobbin in said second position.

10. A device as recited in claim 9 wherein said means for selectively holding said bobbin in said second position is a magnet.

11. A device as recited in claim 10 further comprising means for sensing the position of said bobbin relative to said housing.

12. A device as recited in claim 11 wherein said position sensing means is a capacitor mounted on said housing.

13. A device as recited in claim 11 wherein said position sensing means is an optical encoder.

14. A device as recited in claim 11 further comprising:
   means for establishing a desired stop position for said bobbin; and
   means for determining the difference between the actual position of said bobbin and said desired stop position to generate an error signal and cause an electrical current to flow through said coil when said error signal has an absolute value greater than zero.

15. A device as recited in claim 14 wherein said difference determining means is a microprocessor.

16. A device as recited in claim 15 wherein said bobbin is made of aluminum and said first position is approximately four inches from said second position.

17. A method for inspecting and positioning an assembly component in an automated assembly operation which comprises the steps of:
   providing a device having a permanent magnet creating a magnetic field, said magnet forming a projection, an electrical coil for carrying a current, said coil being disposed around said projection for movement within said magnetic field in response to current flow through said coil, a grip connected with said coil and engageable with said component to generate very light and very precise forces on said component during positioning of said component;
   providing a means for determining the difference between an actual position of said grip and a desired stop position to generate an error signal and cause an electrical current to flow through said coil when said error signal has an absolute value greater than zero;
   generating a flow of current through said coil to selectively move said coil between a withdrawn position and an extended position; and
   monitoring said error signal to reject said assembly component when said error signal attains a predetermined value.

* * * * *